United States Patent
Green et al.

(10) Patent No.: US 10,654,664 B1
(45) Date of Patent: May 19, 2020

(54) TRAY CONVEYOR

(71) Applicant: INTELLIGRATED HEADQUARTERS, LLC, Mason, OH (US)

(72) Inventors: Todd Eliot Green, Baltimore, MD (US); Robert Anderson, Morris Plains, NJ (US); Darius Scott, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/276,732

(22) Filed: Feb. 15, 2019

(51) Int. Cl.
*B65G 47/84* (2006.01)
*B65G 35/06* (2006.01)
*B65G 47/88* (2006.01)

(52) U.S. Cl.
CPC ........... *B65G 47/841* (2013.01); *B65G 35/06* (2013.01); *B65G 47/8815* (2013.01); *B65G 2201/0258* (2013.01); *B65G 2203/0233* (2013.01); *B65G 2203/042* (2013.01)

(58) Field of Classification Search
CPC ........ B65G 35/06; B65G 35/08; B65G 47/28; B65G 47/841; B65G 47/845; B65G 47/8815; B65G 2201/0258; B65G 2203/0233; B65G 2203/042
See application file for complete search history.

(56) References Cited

U.S. PATENT DOCUMENTS

| | | | |
|---|---|---|---|
| 5,290,134 A | 3/1994 | Baba | |
| 6,443,292 B1* | 9/2002 | Grund | B65G 47/244 |
| | | | 198/444 |
| 7,497,317 B2* | 3/2009 | Chang | B65G 47/29 |
| | | | 198/347.1 |
| 8,684,166 B2 | 4/2014 | Huff et al. | |
| 9,902,568 B2* | 2/2018 | Lee | B65G 47/53 |
| 9,914,596 B2* | 3/2018 | Kennerknecht | B65G 35/06 |
| 10,087,018 B2* | 10/2018 | Baechle | B65G 54/02 |
| 2010/0230236 A1* | 9/2010 | Krups | B65G 47/8815 |
| | | | 198/343.2 |
| 2013/0062160 A1* | 3/2013 | Steinbach | B65G 47/52 |
| | | | 198/370.03 |

* cited by examiner

*Primary Examiner* — Gene O Crawford
*Assistant Examiner* — Keith R Campbell
(74) *Attorney, Agent, or Firm* — Alston & Bird LLP

(57) ABSTRACT

The present disclosure relates to a tray locator assembly for aligning one or more trays in a tray-based automated storage and retrieval system. The tray locator assembly may include one or more guide pin assemblies having one or more guide pins engaging with one or more slots formed in a surface of at least one tray of the one or more trays. The tray locator assembly may further include at least one translational actuator to move the one or more guide pins inserted into the one or more slots so as to translate the at least one tray, wherein the translation of the at least one tray separates a second group of trays having a second size from a first group of trays having a first size along the conveyance plane to a second position in order to reduce tolerance stack up associated with the first group of trays.

20 Claims, 6 Drawing Sheets

TRAY CONVEYOR

TECHNOLOGICAL FIELD

Example embodiments of the present invention relate generally to material handling systems, and more particularly, to automated storage and retrieval systems for handling trays.

BACKGROUND

In a high-volume distribution and fulfillment center, tray handling methods and systems play an important part in overall efficiency of the distribution center. Trays are often used with pick and place systems to store and/or convey goods, such as totes, boxes, parcels, and the like. Automatic retrieving, conveying, and placing of trays for a pick and/or place operation is essential to the efficiency of the distribution center.

Applicant has identified several technical challenges associated with tray handling and other associated systems and methods. Through applied effort, ingenuity, and innovation, many of these identified challenges have been overcome by developing solutions that are included in embodiments of the present invention, many examples of which are described in detail herein.

BRIEF SUMMARY

The following presents a simplified summary to provide a basic understanding of some aspects of the disclosed tray conveyor. This summary is not an extensive overview and is intended to neither identify key or critical elements nor delineate the scope of such elements. Its purpose is to present some concepts of the described features in a simplified form as a prelude to the more detailed description that is presented later.

The illustrative embodiments of the present disclosure relate to systems and methods for handling trays in a material handling environment. According to at least one aspect of the present disclosure, a tray-based automated storage and retrieval system is provided. The tray-based automated storage and retrieval system may include a conveyor system for conveying a plurality of trays along a conveyance plane. The plurality of trays may be positioned together as a first group having a first size, and at least one tray of the plurality of trays may include one or more slots formed in a surface of the at least one tray. The tray-based automated storage and retrieval system may further include at least one tray locator assembly positioned adjacent the conveyance plane having one or more guide pin assemblies. The one or more guide pin assemblies may include one or more guide pins to engage the one or more slots of the at least one tray. The at least one tray locator assembly may include at least one translational actuator operatively coupled to the one or more guide pin assemblies and configured to move the one or more guide pins inserted into the one or more slots so as to translate the at least one tray, such that the translation of the at least one tray may separate a second group of trays having a second size from the first group of trays along the conveyance plane to a second position in order to reduce tolerance stack up associated with the first group of trays.

According to one or more embodiments of the present disclosure, the at least one translational actuator may separate the plurality of trays into the second group having the second size by moving the one or more guide pins inserted into the one or more slots from a start position to an end position. Further, in an embodiment, the second group may be smaller than the first group.

According to one or more embodiments of the present disclosure, the tray-based automated storage and retrieval system may include at least two tray locator assemblies periodically positioned below the conveyance plane separated by a predetermined distance, such that the predetermined distance may be proportional to a multiple of a dimension of the at least one tray. Further, in an embodiment, a first tray locator assembly may move one or more guide pins of the first tray locator assembly in a first direction and a second tray locator assembly may move one or more guide pins of the second tray locator assembly in a second direction, such that the second direction is opposite to the first direction.

According to one or more embodiments of the present disclosure, the tray-based automated storage and retrieval system may further include one or more sensors to detect a position of each of the plurality of trays on the conveyor system.

According to one or more embodiments of the present disclosure, the tray-based automated storage and retrieval system may further include a controller. The controller may detect a trigger event for actuating the at least one tray locator assembly, extend the one or more guide pins vertically into the one or more slots of the at least one tray, and actuate the translational actuator to translate the at least one tray, such that the translation of the at least one tray may separate the second group of trays having the second size from the first group of trays along the conveyance plane to the second position in order to reduce tolerance stack up associated with the first group of trays.

According to another aspect of the present disclosure, a tray locator assembly for aligning one or more trays in a tray-based automated storage and retrieval system is provided. The tray locator assembly may include one or more guide pin assemblies having one or more guide pins for engaging with one or more slots formed in a surface of at least one tray of the one or more trays. The tray locator assembly may further include at least one translational actuator, operatively coupled to the one or more guide pin assemblies, for moving the one or more guide pins inserted into the one or more slots so as to translate the at least one tray, such that the translation of the at least one tray may separate a second group of trays having a second size from a first group of trays having a first size along the conveyance plane to a second position in order to reduce tolerance stack up associated with the first group of trays.

According to one or more embodiments of the present disclosure, the tray locator assembly may further include a mounting plate movably coupled to the translational actuator. The mounting plate may mount the one or more guide pin assemblies such that the translation actuator may move the mounting plate to move the one or more guide pins inserted into the one or more slots from a start position to an end position. In an embodiment, the mounting plate may include at least two guide pin assemblies, mounted at each end of the mounting plate, having at least two guide pins to be inserted in at least two slots of the at least one tray.

According to one or more embodiments of the present disclosure, the translational actuator may include a belted actuator driven by a drive assembly.

According to one or more embodiments of the present disclosure, the translational actuator may move the one or more guide pins in a first direction and a second direction, such that the second direction is opposite to the first direction.

According to one or more embodiments of the present disclosure, the one or more guide pin assemblies may further include at least one actuator for extending the one or more guide pins into the one or more slots and for retracting the one or more guide pins back to an original position.

According to one or more embodiments of the present disclosure, the tray locator assembly may further include one or more proximity sensors for detecting a position of the one or more slots of the at least one tray and/or an extend and/or retract position of the one or more guide pins.

According to another aspect of the present disclosure, a method of operating a tray-based automated storage and retrieval system is provided. The method may include conveying a plurality of trays along a conveyance plane, such that the plurality of trays is positioned together as a first group having a first size, and at least one tray of the plurality of trays includes one or more slots formed in a surface of the at least one tray. The method may further include detecting, by a controller of the tray-based automated storage and retrieval system, a trigger event for actuating a tray locator assembly positioned underneath the conveyor system. The method may further include engaging one or more guide pins, of one or more guide pin assemblies of the tray locator assembly, with the one or more slots of the at least one tray, and translating, by a translational actuator operatively coupled to the one or more guide pin assemblies, the at least one tray, such that the translation of the at least one tray may separate a second group of trays having a second size from the first group of trays along the conveyance plane to a second position in order to reduce tolerance stack up associated with the first group of trays.

According to one or more embodiments of the present disclosure, the method may further include separating the plurality of trays into the second group having the second size by moving the one or more guide pins inserted into the one or more slots from a start position to an end position, such that the second group is smaller than the first group.

According to one or more embodiments of the present disclosure, the trigger event may include an indication, by one or more sensors of the tray-based automated storage and retrieval system, of the at least one tray being positioned adjacent the tray locator assembly.

According to one or more embodiments of the present disclosure, the trigger event may include an indication, by one or more sensors of the tray-based automated storage and retrieval system, of receiving the plurality of trays on the conveyance plane.

According to one or more embodiments of the present disclosure, the trigger event may include an indication, by one or more sensors of the tray-based automated storage and retrieval system, of misalignment of the at least one tray from a determined position.

According to one or more embodiments of the present disclosure, the method may further include determining, by the controller, the end position based on at least a degree of misalignment of the at least one tray from the determined position.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
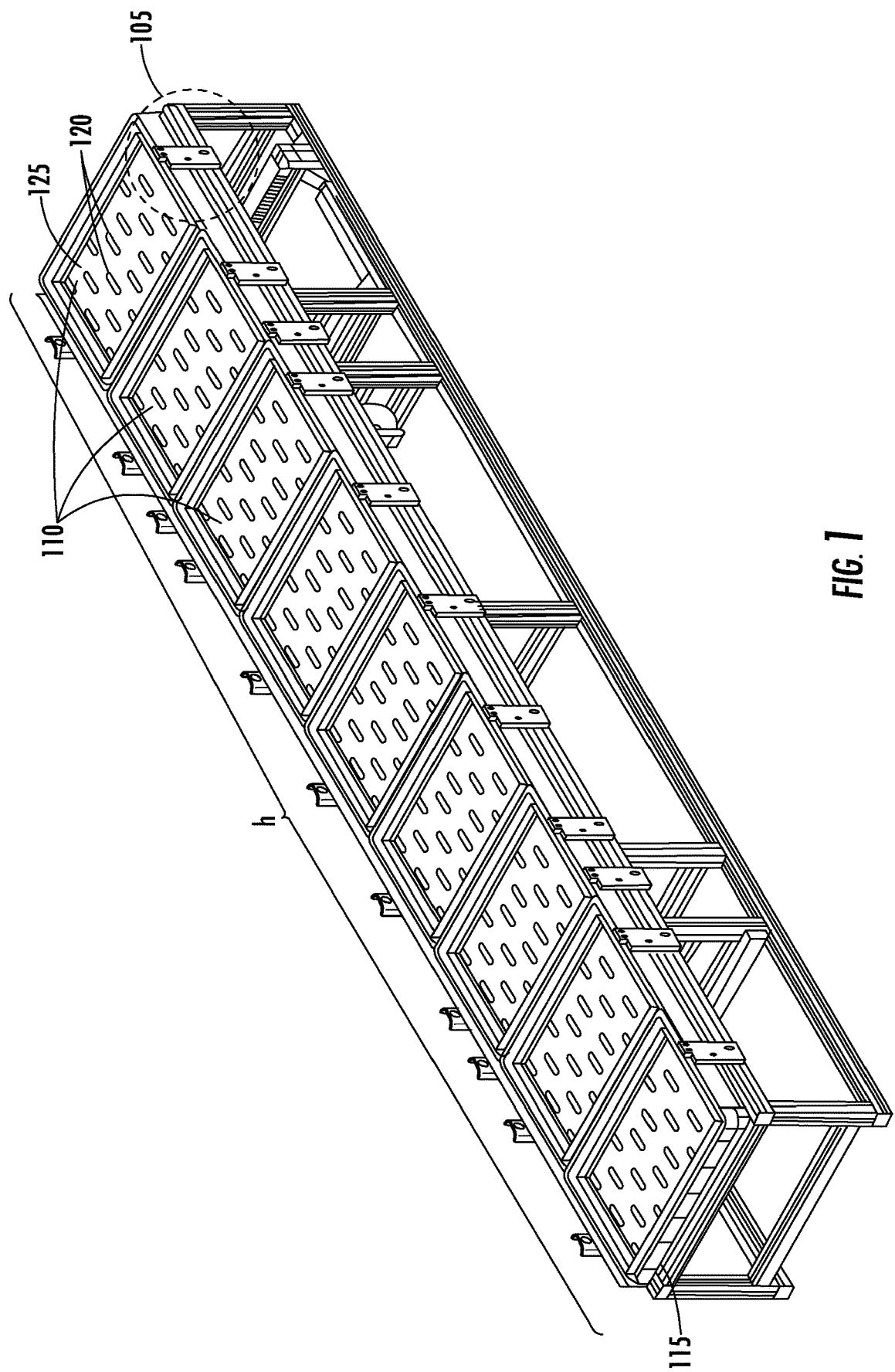
FIG. 1 illustrates a perspective view of a tray-based automated storage and retrieval system in accordance with an embodiment of the present disclosure.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art of the present disclosure that these concepts may be practiced without these specific details.

As described above, in a conventional distribution and/or order fulfillment centers, trays are generally used for storing items, for temporary handling, and/or for conveying to a pick and/or place station. Often, a distribution and/or order fulfillment center may include a tray-based storage and retrieval system. The tray-based storage and retrieval system may have a plurality of trays on a conveyor pushing against one another to shift positions for each pick and/or place cycle. A conventional pick and/or place system may include a set of grippers that are programmed to automatically pick from and/or place items into the tray. Thus, the set of grippers may be positioned at a pitch that may depend on the tray's dimensions and/or location. Any deviation in the tray size, position, and/or orientation may lead to a jam or other impingement of the tray and/or misplacement of items on the trays.

Further, temperature and/or other ambient conditions may vary in a typical storage system in a distribution and/or order fulfillment center. As a result, a tray's dimensions may be susceptible to changes due to at least a thermal expansion or compression of the tray's material. As a row of several trays are pushed together on the conveyor system, these variations in each tray's dimensions may result in a very large discrepancy from a desired tray location (e.g. compounded by the number of trays). As described above, these discrepancies may cause grippers or other elements to be misaligned with corresponding elements of the tray resulting in the jamming of trays and/or the misplacement of items. Accordingly, devices of the present application provide for an external device that may relocate the trays to reduce these discrepancies (e.g., tolerance stack up) to provide for precisely-aligned, repeatable pick and place processing.

The tray-based storage and retrieval system described herein, in accordance with one or more embodiments of the present disclosure, includes a tray locator assembly for relocating trays to correct any misalignment from a desired tray location and/or to separate trays from a large size group of trays into one or more small size groups.

FIG. 1 illustrates a perspective view of a tray-based automated storage and retrieval system 100, in accordance with one or more embodiments of the present disclosure. As shown in FIG. 1, the tray-based automated storage and retrieval system 100 may include a conveyor system 105 for conveying trays 110. In an embodiment, the conveyor system 105 may receive trays 110 retrieved from a storage unit (not shown) for a pick and/or place operation. That is, the conveyor system 105 may convey and/or position the trays 110 at a specific pick and place location, such that, a picker (e.g., a robotic arm) may pick items from and/or place items into the trays 110. Additionally or alternatively, a robotic arm may grasp and/or lift one or more trays 110 and/or products off the surface of the trays 110 positioned at a specific location. The conveyor system 105 may include any means of conveying the trays 110, such as, but not limited to, belted conveyors, roller conveyors, slide rails, idler roller rails, and the like. In an example embodiment, the conveyor system 105 may include a conveyor frame and a plurality of rollers disposed along at least one side of the conveyor frame, such that, the plurality of rollers may support and move the trays 110 forward in a direction of conveyance. Thus, the trays 110 may be supported and conveyed by the conveyor system 105 along a conveyance plane 115.

Further, as shown in FIG. 1, the conveyor system 105 may receive a group of trays 110 together in a slug (e.g., a collection of trays 110 located substantially end-to-end). In an embodiment, the conveyor system 105 may receive and/or convey trays 110 in a first group having a first size n along the conveyance plane 115, as shown in FIG. 1. In an exemplary embodiment, the first group of size n may include nine trays 110, received and/or pushed by the conveyor system 105 together (e.g., as a slug). It should be noted that the term size as referred above may refer to any dimension depending upon the application of the system. As described above, pushing and/or conveying a slug of trays 110 may result in a degree of misalignment between a current position of the one or more trays 110 and a desired position, such as, a predetermined pick and place location. As would be evident to one of ordinary skill in the art in light of the present disclosure, the potential for misalignment attributed to the discrepancy of each tray 110 may be referred to herein as tolerance stack up (e.g., the compounding of tolerance misalignment).

Further, the trays 110 may include one or more slots 120 defined by a surface 125 of the trays 110 (e.g., a bottom surface). The term "slots" as used herein may refer to any opening, depression, and/or any other engagement feature in a surface of the tray. Since the trays 110 may be supported by the conveyor system 105 at the sides of the trays 110, the bottom surface 125 and/or the slots 120 at the bottom surface 125 may be accessible from either side of the trays 110. For the sake of convenience of description, reference is made herein to a bottom surface 125 and slots accessible from beneath the conveyance plane 115.

Figure 2:
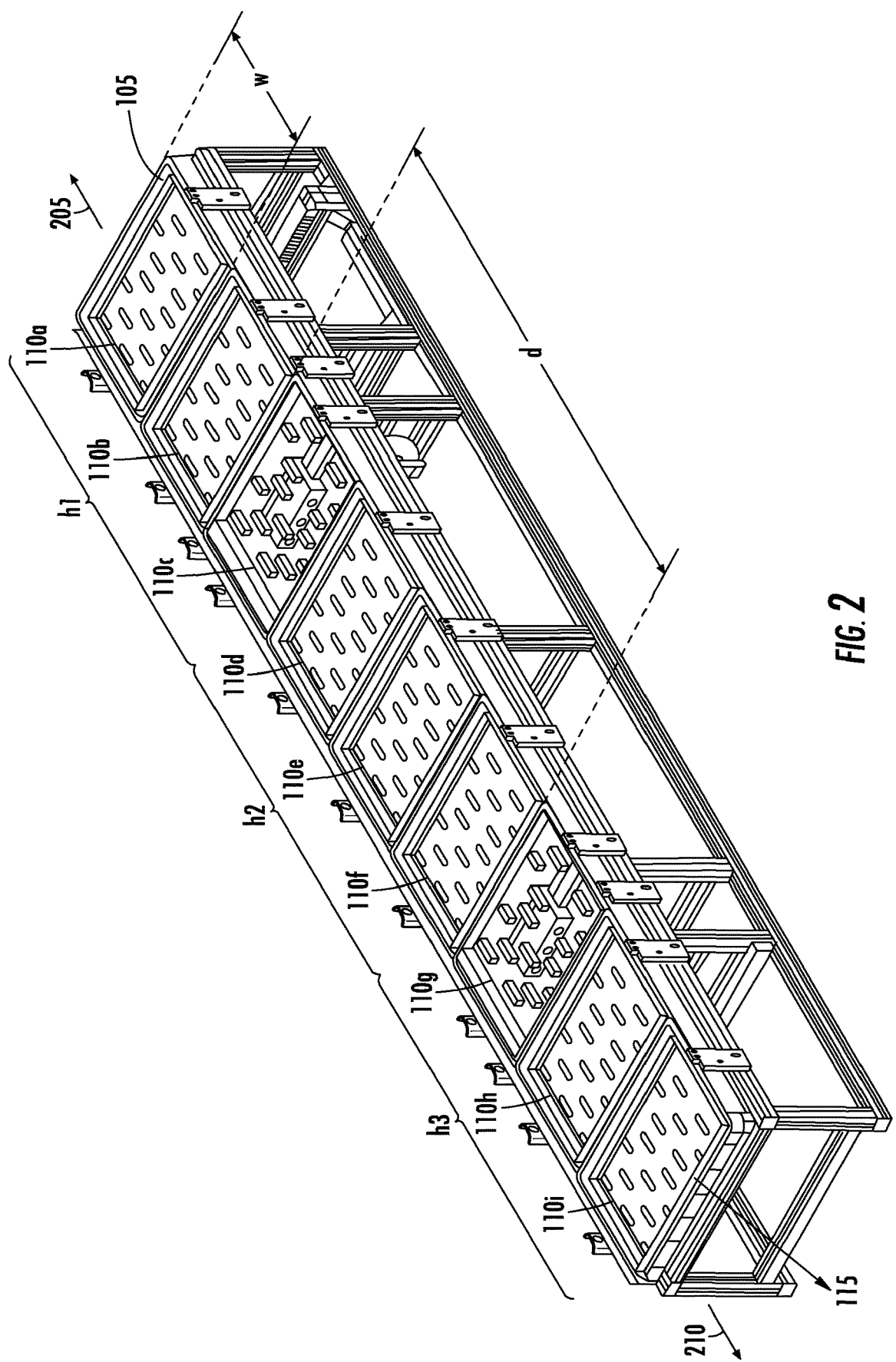
FIG. 2 illustrates another perspective view of the tray-based automated storage and retrieval system, in accordance with one or more embodiment of the present disclosure.

FIG. 2 illustrates a perspective view of the tray-based automated storage and retrieval system 100, in accordance with one or more embodiments of the present disclosure. As shown in FIG. 2, the tray-based automated storage and retrieval system 100 may further include tray locator assemblies 200 positioned underneath (e.g., adjacent a surface of the trays) the trays 110, below the conveyance plane 115. In accordance with one or more embodiments of the present disclosure, the tray locator assemblies 200 may relocate the trays 110 to position them at desired pick and/or place positions. Further, the tray locator assemblies 200 may separate a large size group of trays 110 (e.g., first group having a first size) pushed together into small size groups of trays 110 (e.g., second group having a second size) so as to reduce discrepancies from variations in one tray size and/or position causing discrepancies in position of all trays in the group.

As shown in FIG. 2, a first group of trays 110 may include trays 110a-110i. The tray locator assemblies 200 may be positioned underneath the conveyance plane 115 at periodic intervals. In an example embodiment, the tray locator assemblies 200 may be separated by a predetermined distance d, as shown in FIG. 2. In an embodiment, the predetermined distance d may be determined based on a one or more dimensions of the tray 110. For example, the predetermined distance d may be proportional to a multiple of a dimension, such as, width w, of the tray 110. For example, if the width w of a tray 110 is x units, the predetermined distance d between adjacent tray locator assemblies 200 may be 3x, if a spacing of three trays is desired. As shown in FIG. 2, the tray locator assemblies 200 may be positioned underneath trays 110c and 110g.

In an example embodiment, the tray locator assemblies 200 may engage with the trays 110c and 110g, as will be described later, to push the trays 110c and 110g from a first position to a second (i.e. desired) position. In an embodiment, the trays 110c and 110g may subsequently push other trays when trays 110c and 110g are being pushed by the tray locator assemblies 200. For example, tray 110c may be pushed by the tray location assembly in a first direction 205, as shown in FIG. 2. The tray 110c may push tray 110b adjacent to 110c, which may further push tray 110a in the first direction 205. Similarly, tray 110g may be pushed by the tray location assembly in a second direction 210, as shown in FIG. 2. The tray 110g may push tray 110h adjacent to 110g, which may further push tray 110i in the second direction 210. Thus, a large size group of trays 110 may be broken into a second group or one or more smaller sized groups n1, n2, n3, as shown in FIG. 2. Thus, as described above, the tray locator assemblies 200 may relocate the trays 110 to reduce a degree of misalignment between a first position and a second position. Further, the tray locator assemblies 200 may separate the trays 110 from a large sized group into one or more small size groups, as shown in FIG. 2.

Figure 3A:
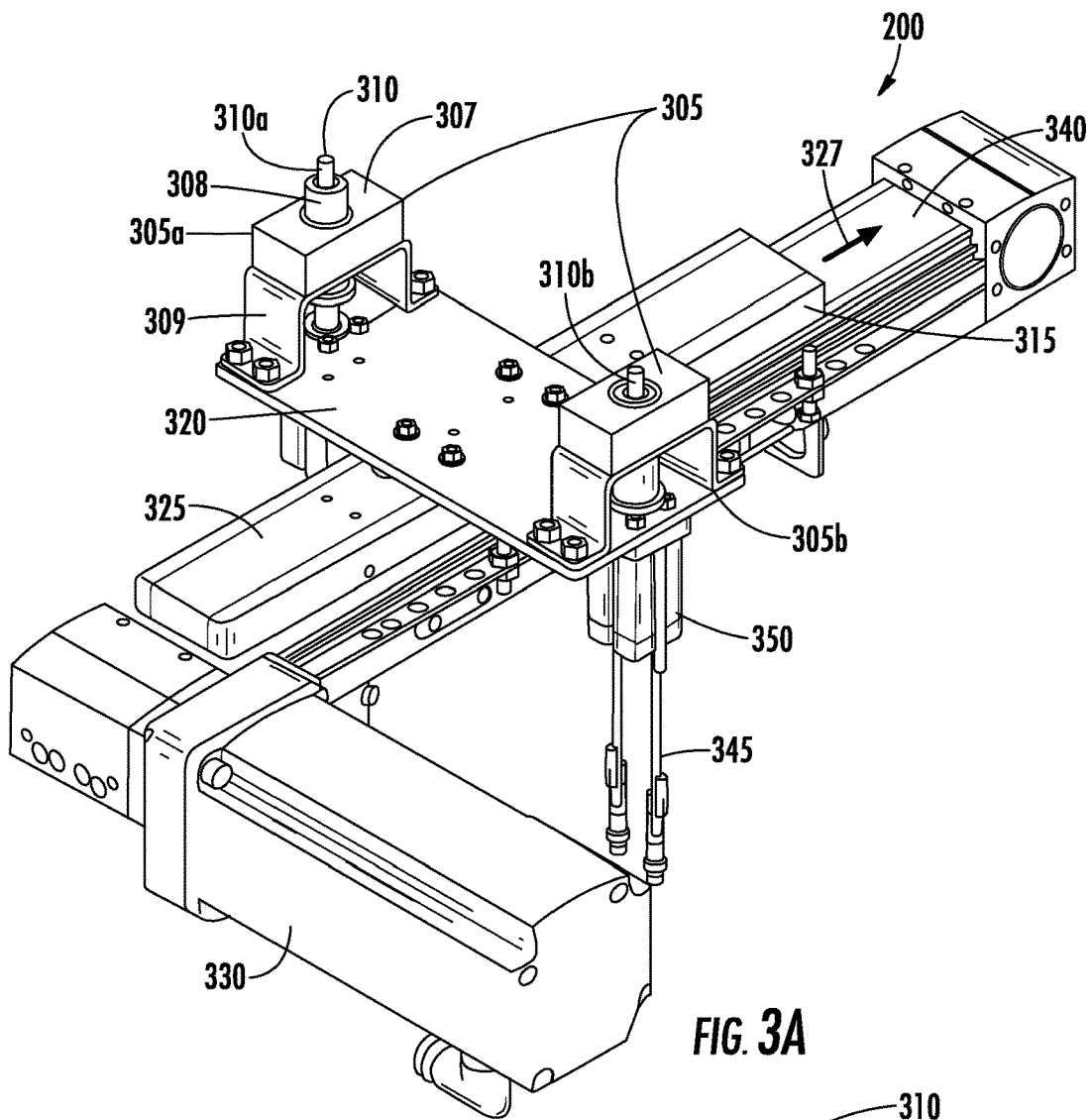
FIG. 3a illustrates a perspective view of a tray locator assembly, in accordance with one or more embodiments of the present disclosure.

FIG. 3a illustrates a perspective view of the tray locator assembly 200, in accordance with one or more embodiments of the present disclosure. As described above, the tray locator assembly 200 may engage with a tray 110 positioned above the tray locator assembly 200 to relocate the tray 110. As shown in FIG. 3a, the tray locator assembly 200 may include one or more guide pin assemblies 305. In an example embodiment, the tray locator assembly 200 may include a first guide pin assembly 305a and a second guide pin assembly 305b. The guide pin assemblies 305a, 305b may further include one or more guide pins 310 for engaging with the tray 110. In an example embodiment as shown in FIG. 3a, the first guide pin assembly 305a may include a first guide pin 310a and the second guide pin assembly 305b may include a second guide pin 310b. Each of the first and second guide pin assemblies 305a and 305b may further include a bearing block 307 that houses a bearing 308 positioned as a sleeve to the guide pin 310, as shown in FIG. 3a. The first and second guide pin assemblies 305a and 305b may further include a mounting bracket 309 for mounting the first and second guide pin assemblies 305a and 305b to a mounting plate 320 of the tray locator assembly 200. The mounting plate 320 may include a plate and/or any other structure suitable for mounting one or more guide pin assemblies 305. In an example embodiment, the mounting plate 320 may include the first guide pin assembly 305a mounted at a first end of the mounting plate 320 and the second guide pin assembly 305b mounted at a second end of the mounting plate 320. A space between the first and second guide pin assemblies 305a and 305b may be based on the spacing between two slots of the tray 110.

Further, the tray locator assembly 200 may include a translational actuator 315 operatively coupled to the guide pin assemblies 305 for moving the guide pin assemblies 305 engaged with the tray 110 thereby pushing the tray 110. In an example embodiment, the mounting plate 320 having the first and second guide pin assemblies 305a and 305b may be movably coupled to the translational actuator 315. The translational actuator 315 may include any means for causing a translational motion in the mounting plate 320 coupled to the translational actuator 315. For example, the translation actuator 315 may include a belted actuator 325 coupled to a drive assembly 330, as shown in FIG. 3a. The mounting plate 320 may be coupled to the belted actuator 325, and the belted actuator 325 may be driven by the drive assembly 330 to be movable in a first direction 327 or in a direction opposite to the first direction 327. Specifically, the drive assembly 330 may include a drive (not shown), such as, but not limited to, a motor, driving a roller (not shown). A belt 340 may be driven by the roller, as shown in FIG. 3a. The belted actuator 325 may be coupled to the belt 340, such that, when the belt 340 is driven in the first direction 327, the belted actuator 325 and subsequently the mounting plate 320, move in the first direction 327. In an example embodiment, the translational actuator 315 may include a timing belt (not shown) for controlled motion of the belted actuator 325. Thus, the translational actuator 315 may move the guide pin assemblies 305 from a start position, for example a current position of the tray 110, to an end position, for example a desired position of the tray 110, thereby pushing the tray 110 from the first position to the second position.

Figure 3B:
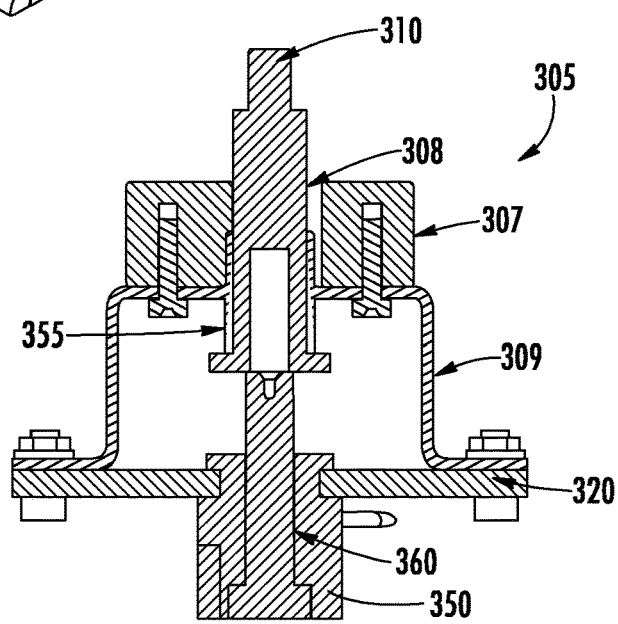
FIG. 3b illustrates a sectional view of the tray locator assembly, in accordance with one or more embodiments of the present disclosure.

FIG. 3b illustrates a sectional view of the guide pin assembly 305, in accordance with one or more embodiments of the present disclosure. As described above, the guide pin assembly 305 may include one or more guide pins 310 for engaging the tray 110. In an example embodiment, the guide pin 310 may be insertable in or otherwise received by a slot 120 at the bottom surface 125 of the tray 110, as shown in FIG. 1. Further, the guide pin 310 may reciprocate vertically, that is, may extend to be inserted into the slot 120 of the tray 110, and may retract back to an original position (e.g., not in engagement with the slots 120).

As shown in FIG. 3b, the guide pin assembly 305 may further include the bearing 308 housed in the bearing block 307. The bearing 308 may act as a sleeve around the guide pin 310. Further, the guide pin assembly 305 may include a spring 355 and an actuator 360, as shown in FIG. 3b. The spring 355 and the actuator 360 may be operatively coupled to the guide pin 310, such that the guide pin 310 may be actuated by the actuator 360 so as to push the guide pin 310 outwards and into the slot 120 of the tray 110. The guide pin 310, when actuated, may push against the spring 355 that may act as return spring for retracting the guide pin 310 back into an original position. In an example embodiment, the actuator 360 may include short stroke air cylinders.

The tray locator assembly 200 may further include a reed switch 345, as shown in FIG. 3a, for detecting a position of the actuator 360 before initiating a pushing motion by the translational actuator 315. Specifically, the actuator 360 may include a magnetic section made of a magnetic and/or ferrous material such that the reed switch 345 may detect an upward and downward motion of the actuator 360 based on the magnetic section. Thus, the translational actuator 315 may be actuated only when the reed switch 345 detects that the guide pin 310 is fully extended so as to prevent damage and/or breaking of the guide pin 310. Further, the guide pin assembly 305 including the mounting bracket 309 and the actuator 360 may be mounted on the mounting plate 320, as shown in FIG. 3b. Thus, for relocating the tray 110, the tray locator assembly 200 may control the actuator 360 to extend the guide pin 310 to be inserted into the slot 120 of the tray 110, and may control the translational actuator 315 to move the guide pin 310 from a start position to an end position, thereby pushing the tray 110 from the first position to the second position.

Figure 4:
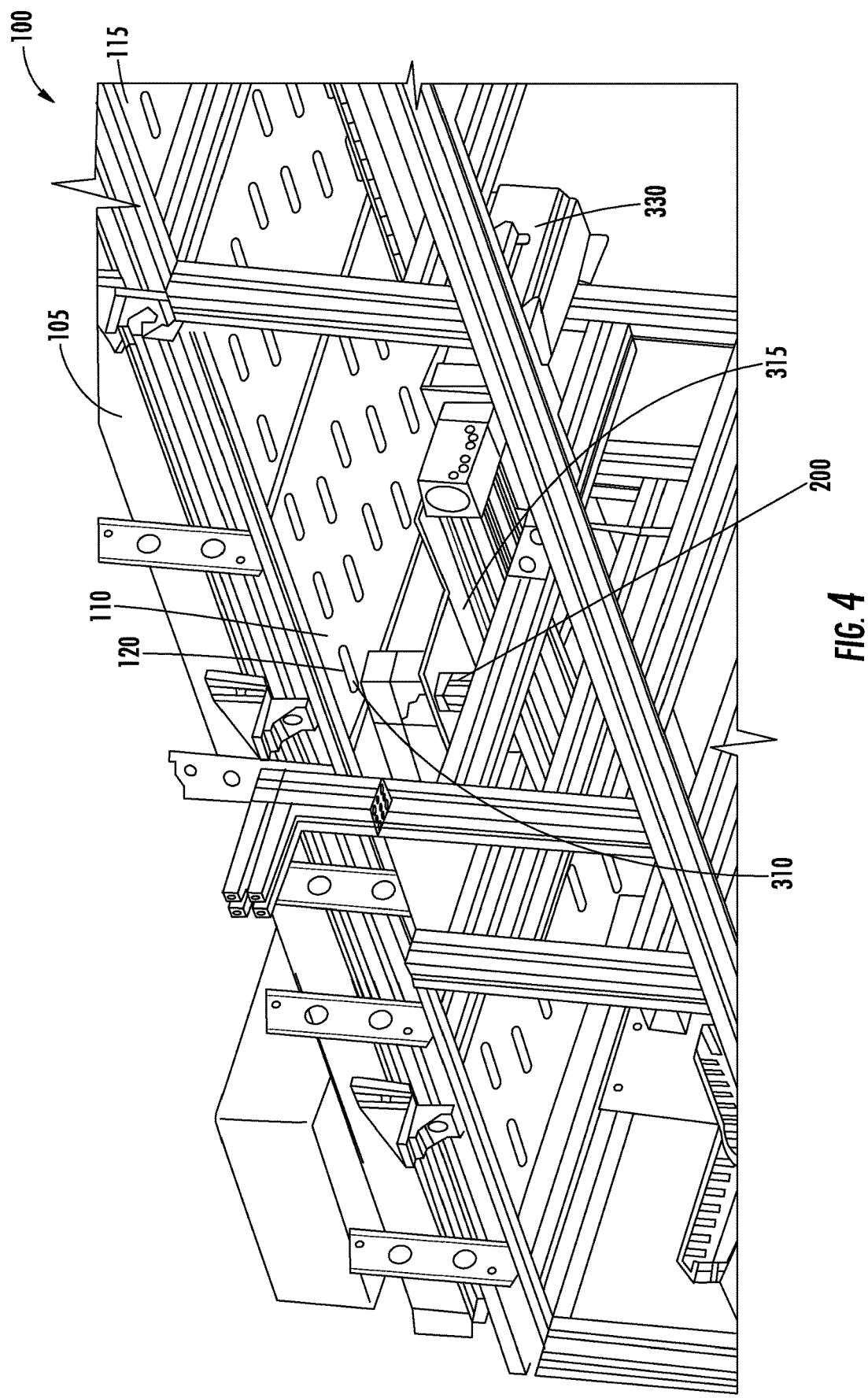
FIG. 4 illustrates a further perspective view of the tray-based automated storage and retrieval system, in accordance with one or more embodiments of the present disclosure.

FIG. 4 illustrates a perspective view of the tray-based automated storage and retrieval system 100, in accordance with one or more embodiments of the present disclosure. FIG. 4 depicts the tray locator assembly 200 engaging with the tray 110 located on the conveyor system 105. As shown, the tray locator assembly 200 is positioned underneath the tray 110 and below the conveyance plane 115. As described above, the guide pin 310 of the tray locator assembly 200 may be inserted into the slot 120 of the tray 110. Further, to relocate the tray 110, the translational actuator 315 of the tray locator assembly 200 may move the guide pin 310, operatively coupled to the translational actuator 315 and inserted into the slot 120, from a start position to an end position in and/or against a direction of conveyance.

In an example embodiment, the conveyor system 105 and/or the tray locator assembly 200 may include one or more sensors, such as, but not limited to, photoeyes, cameras, proximity sensors, and the like. The one or more sensors may detect at least a position of the one or more trays 110. Further, a controller (e.g., controller 500 in FIG. 5) of the tray-based automated storage and retrieval system 100, as will be described later, may receive data from the one or more sensors. The controller may further be communicatively coupled to one or more components of the tray-based automated storage and retrieval system 100, such as, but not limited to, the conveyor system 105, the tray locator assembly 200, and the like.

In an example embodiment, the tray-based automated storage and retrieval system 100 and/or the controller may control the actuation of the tray locator assembly 200 based on a trigger event. The term "trigger event" as used herein may refer to a change in a function and/or operation of the tray-based automated storage and retrieval system 100 that may be detected by the tray-based automated storage and retrieval system 100 as a trigger to actuate the tray locator assembly 200. The trigger event may, in some embodiments, include an indication, by the one or more sensors, of the tray 110 positioned above the tray locator assembly 200. For example, a photoeye sensor positioned on the conveyor system 105 above the tray locator assembly 200 may detect a presence of the tray 110 at the position above the tray locator assembly 200 and may provide an indication of the trigger event to the tray-based automated storage and retrieval system 100 and/or the controller (e.g., controller 500 in FIG. 5).

In another embodiment, the trigger event may include an indication, by the one or more sensors, of receiving the plurality of trays 110 on the conveyor system 105. For example, one or more sensors and/or the controller may detect that a slug of trays 110 is received on the conveyor system 105. Further, based on the number of trays 110 in the slug, dimensions, such as width of each tray 110 and/or a speed of conveyance, the tray-based automated storage and retrieval system 100 and/or the controller may detect a trigger event for actuating the tray locator assembly 200 based on a time taken by the tray 110 to travel to a position above the tray locator assembly 200.

Further, in another embodiment, the trigger event may include an indication, by the one or more sensors, of misalignment of the tray 110 from a determined position. For example, the one or more sensors may determine that the tray 110 is positioned inaccurately at a determined pick and/or place position, and may provide an indication of the misalignment to the tray-based automated storage and retrieval system 100 and/or the controller. In response, the tray-based automated storage and retrieval system 100 and/or the controller may detect a trigger event for actuating the tray locator assembly 200. Further, the tray locator assembly 200 and/or the controller may determine a start position and an end position for the guide pin 310 based on a degree of misalignment of the tray 110 from the determined position.

In an example embodiment, the tray locator assembly 200 may include one or more sensors, such as, but not limited to, proximity sensors, for detecting a slot 120 of the tray 110. For example, a photoeye facing upwards may be mounted on the tray locator assembly 200 next to the guide pin 310 such that a slot 120 may be determined to be present if the photoeye is unblocked. Thus, the tray locator assembly 200 may ensure that the slot 120 is present above the guide pin 310 before actuating the guide pin 310.

Further, as described above, with reference to FIG. 3a, the tray locator assembly 200 may include two guide pins 310 to be inserted into two corresponding slots 120 of the tray 110. Thus, two guide pins 310 pushing the tray 110 together may ensure that tray 110 stays in alignment with the conveyor system 105 while moving so as to prevent skewing of the tray 110.

Figure 5:
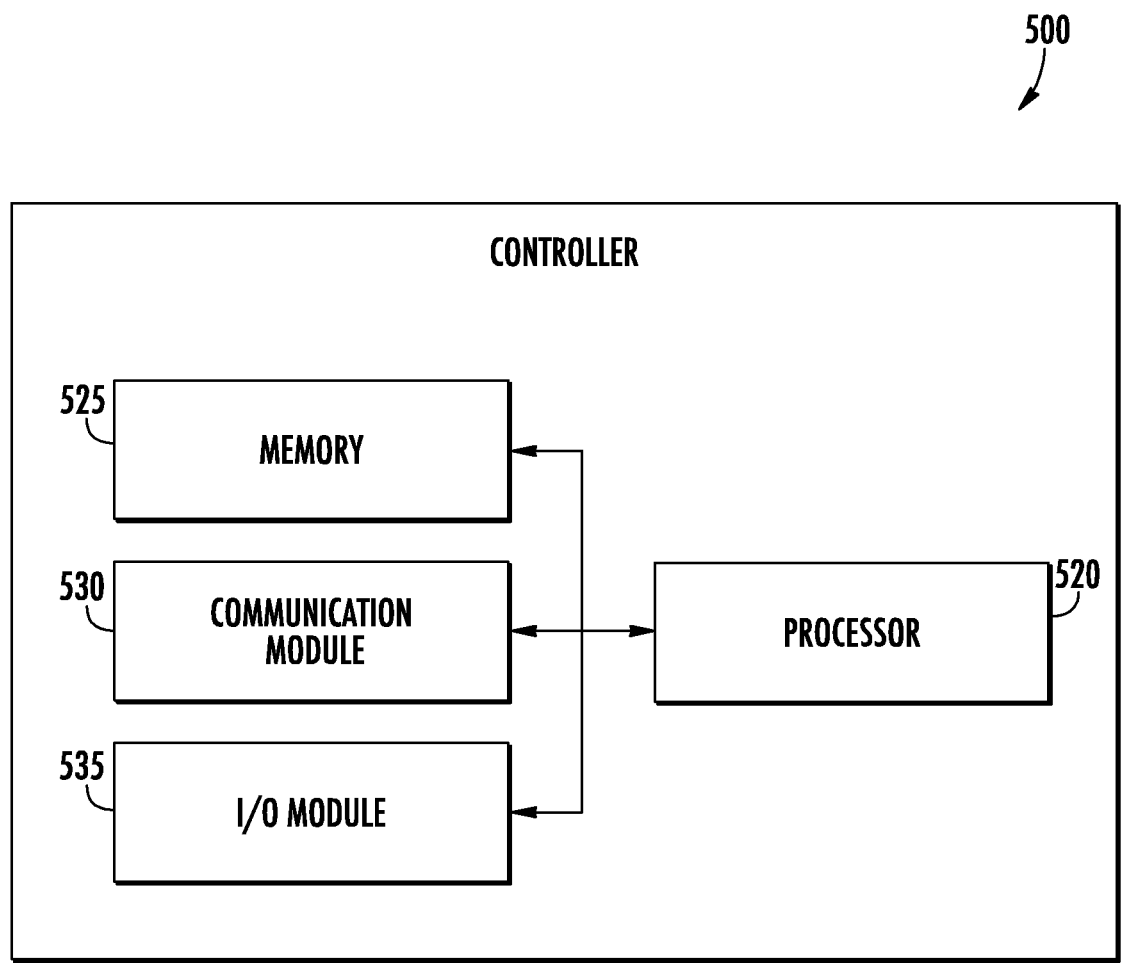
FIG. 5 illustrates a schematic block diagram of a controller of the tray-based automated storage and retrieval system, in accordance with one or more embodiments of the present disclosure.

FIG. 5 illustrates a schematic block diagram of a controller 500 for controlling the operation of the tray-based automated storage and retrieval system 100, in accordance with one or more embodiments of the present disclosure. As shown, the controller 500 may include at least one processor 520, memory 525, communication module 530, and input/output module 535. The processor 520 may be configured with processor executable instructions to perform operations described herein. Processor 520 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments processor 520 may comprise a plurality of processors. The plurality of processors may be embodied on a single device or may be distributed across a plurality of devices. The plurality of processors may be in operative communication with each other and may be collectively configured to perform one or more functionalities of the controller 500 as described herein. In an example embodiment, processor 520 is configured to execute instructions stored in memory 525 or otherwise accessible to processor 520. These instructions, when executed by processor 520, may cause controller 500 to perform one or more of the functionalities of controller 500, as will be described with reference to FIG. 6.

Memory 525 may comprise, for example, volatile memory, non-volatile memory, or some combination thereof. Although illustrated in FIG. 5 as a single memory, memory 525 may comprise a plurality of memory components. The plurality of memory components may be embodied on a single device or distributed across a plurality of devices. In various embodiments, memory 525 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 525 may be configured to store information, data (including item data and/or profile data), applications, instructions, or the like for enabling controller 500 to carry out various functions in accordance with example embodiments of the present invention. For example, in at least some embodiments, memory 525 may buffer input data for processing by processor 520. Additionally or alternatively, in at least some embodiments, memory 525 may store program instructions for execution by processor 520.

Memory 525 may store information in the form of static and/or dynamic information. This stored information may be stored and/or used by the controller 500 during the course of performing its functionalities.

Communications module 530 may be embodied as any device or means embodied in circuitry, hardware, a computer program product comprising computer readable program instructions stored on a computer readable medium (e.g., memory 525) and executed by a processing device (e.g., processor 520), or a combination thereof that is configured to receive and/or transmit data from/to another device and/or network, such as, for example, sensors, conveyor system 105, tray locator assemblies 200, and the like. In some embodiments, communications module 530 (like other components discussed herein) may be at least partially embodied as or otherwise controlled by processor 520. In this regard, communications module 530 may be in communication with processor 520, such as via a bus. Communications module 530 may include, for example, an antenna, a transmitter, a receiver, a transceiver, network interface card and/or supporting hardware and/or firmware/software for enabling communications with another device. Communications module 530 may be configured to receive and/or transmit any data that may be stored by memory 525 using any protocol that may be used for communications between devices. Communications module 530 may additionally or alternatively be in communication with the memory 525, input/output module 535 and/or any other component of the controller 500, such as via a bus.

Input/output module 535 may be in communication with processor 520 to receive an indication of a user input and/or to provide an audible, visual, mechanical, or other output to a user. As such, input/output module 535 may include support, for example, for a keyboard, a mouse, a joystick, a display, a touch screen display, a microphone, a speaker, a RFID reader, barcode reader, biometric scanner, and/or other input/output mechanisms. In embodiments wherein the controller 500 is embodied as a server or database, aspects of input/output module 535 may be reduced as compared to embodiments where the controller 500 is implemented as an end-user machine (e.g., remote worker device and/or employee device) or other type of device designed for complex user interactions. In some embodiments (like other components discussed herein), input/output module 535 may even be eliminated from the controller 500. Alternatively, such as in embodiments wherein the controller 500 is embodied as a server or database, at least some aspects of input/output module 535 may be embodied on an apparatus used by a user that is in communication with the controller 500. Input/output module 535 may be in communication with the memory 525, communications module 530, and/or any other component(s), such as via a bus. One or more than one input/output module and/or other component can be included in the controller 500.

As described above and as will be appreciated based on this disclosure, embodiments of the present invention may be configured as methods, personal computers, servers, mobile devices, backend network devices, and the like. Accordingly, embodiments may comprise various means formed entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 520, as discussed above with reference to FIG. 5, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 525) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Figure 6:
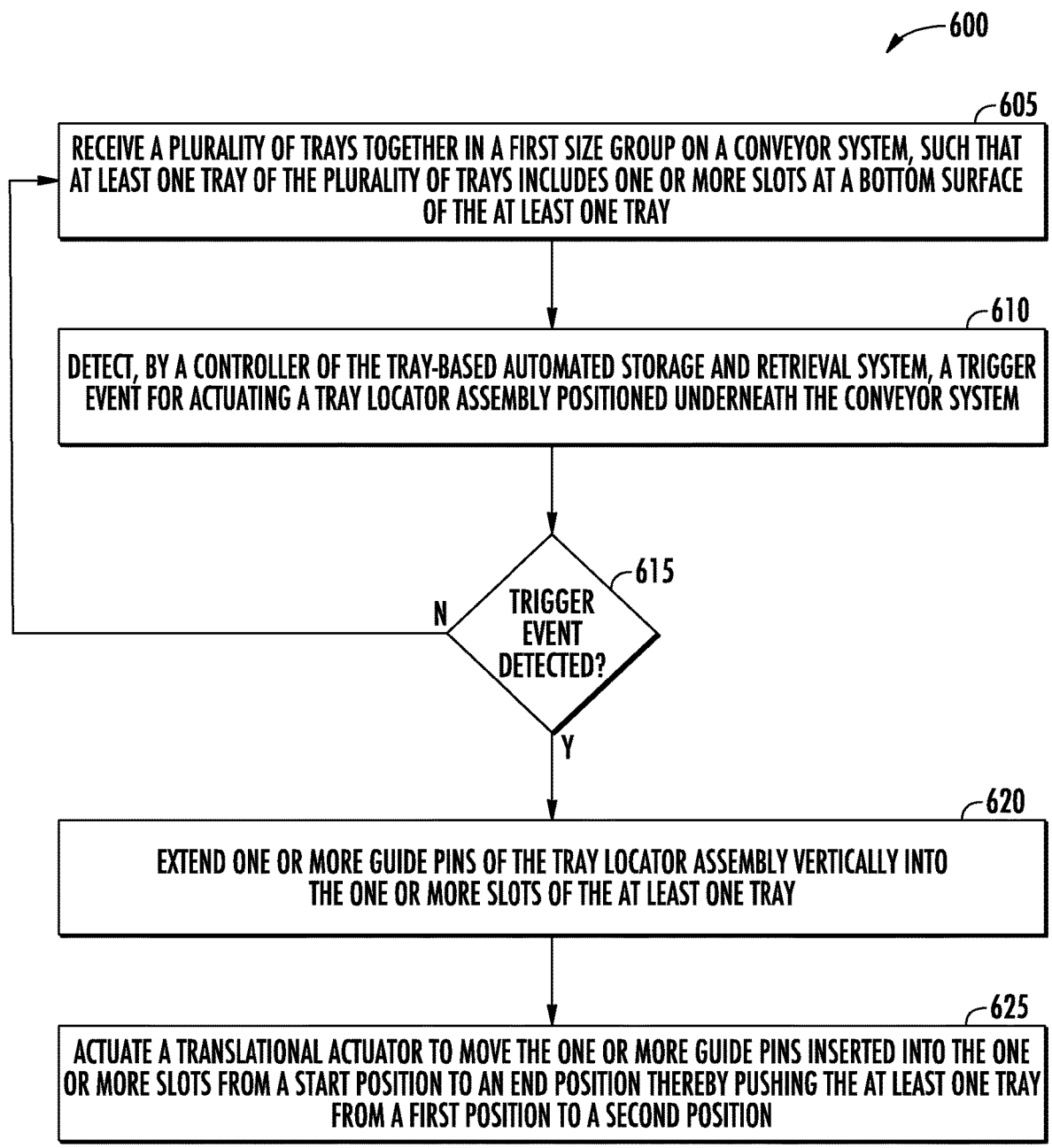
FIG. 6 illustrates an example method for operating the tray-based automated storage and retrieval system, in accordance with one or more embodiments of the present disclosure.

FIG. 6 illustrates an example method 600 for operating the tray-based automated storage and retrieval system 100, in accordance with one or more embodiments of the present disclosure. The method 600 may include conveying a plurality of trays 110 along the conveyance plane 115 such that the plurality of trays 110 is positioned together as a first group having a first size n, as shown in FIG. 1, at block 605. As described above, in an embodiment, trays 110 may include one or more slots 120 at a surface 125 of the tray 110. The method 600 may further include detecting, by the tray-based automated storage and retrieval system 100 and/or the controller 500, a trigger event for actuating a tray locator assembly 200 positioned adjacent the conveyor system 105, at block 610. As described above, the tray-based automated storage and retrieval system 100 and/or the controller may control the actuation of the tray locator assembly 200 based on a trigger event. The term 'trigger event' as used here may refer to a change in a function and/or operation of the tray-based automated storage and retrieval system 100 that may be detected by the tray-based automated storage and retrieval system 100 as a trigger to actuate the tray locator assembly 200. In an embodiment, the trigger event may include an indication, by the one or more sensors, of the tray 110 being adjacent the tray locator assembly 200. In another embodiment, the trigger event may include an indication, by the one or more sensors, of receiving the plurality of trays 110 on the conveyor system 105. Further, in another embodiment, the trigger event may include an indication, by the one or more sensors, of misalignment of the tray 110 from a determined position.

Further, if, at block 615, it is determined, by the tray-based automated storage and retrieval system 100 and/or the controller 500, that a trigger event is not detected, the method 600 may proceed to block 605. However, if, at block 615, a trigger event is detected, by the tray-based automated storage and retrieval system 100 and/or the controller 500, the method 600 may proceed to block 620.

At block 620, the method 600 may include engaging, by the tray locator assembly 200 and/or the controller 500, one or more guide pins 310 of the tray locator assembly 200 with the one or more slots 120 of the tray 110, as shown in FIG. 4. As described above, with reference to FIG. 3b, the actuator 360 of the guide pin assembly 305 may actuate the guide pin 310 to extend vertically upwards into the slot 120 of the tray 110. Thus, engaging the tray locator assembly 200 with the tray 110.

The method 600 may further include actuating, by the tray locator assembly 200 and/or the controller 500, a translational actuator 320 to move the at least one tray 110 such that the translation of the at least one tray 110 separates a second group of trays having a second size from the first group of trays along the conveyance plane to a second position in order to reduce tolerance stack up associated with the first group of trays, at block 625. As described above, with reference to FIG. 3a and FIG. 4, the translational actuator 315 of the tray locator assembly 200 may move the belted actuator 325 and subsequently the mounting plate 320 having the guide pin 310 towards and/or away from a direction of conveyance of the trays 110. Thereby, separating a smaller sized group (i.e. second group) from a large sized group (i.e. first group) of trays in order to reduce discrepancies caused by multiple trays 110 being pushed together (e.g., reduce tolerance stack up).

Thus, the tray-based automated storage and retrieval system 100 may automatically relocate the trays 110 to correct any misalignment from a desired pick and/or place position. The tray-based automated storage and retrieval system 100 may also separate trays 110 being pushed in a large group size into one or more small size groups, for reducing tolerance stack up.

It must be noted that, as used in this specification and the appended claims, the singular forms "a," "an," and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A tray-based automated storage and retrieval system comprising:
   a conveyor system configured to convey a plurality of trays along a conveyance plane, wherein the plurality of trays are position together as a first group having a first size, and wherein at least one tray of the plurality of trays comprises one or more slots formed in a surface of the at least one tray; and
   at least one tray locator assembly positioned adjacent the conveyance plane comprising:
   one or more guide pin assemblies comprising one or more guide pins configured to engage the one or more slots of the at least one tray; and
   at least one translational actuator operatively coupled to the one or more guide pin assemblies and configured to move the one or more guide pins inserted into the one or more slots so as to translate the at least one tray, wherein the translation of the at least one tray separates a second group of trays having a second size from the first group of trays along the conveyance plane to a second position in order to reduce tolerance stack up associated with the first group of trays.

2. The tray-based automated storage and retrieval system of claim 1, wherein the at least one translational actuator is configured to separate the plurality of trays into the second group having the second size by moving the one or more guide pins inserted into the one or more slots from a start position to an end position.

3. The tray-based automated storage and retrieval system of claim 1, wherein the second size group is smaller than the first size group.

4. The tray-based automated storage and retrieval system of claim 1, further comprising at least two tray locator assemblies periodically positioned adjacent the conveyance plane and separated by a determined distance, wherein the determined distance corresponds to a multiple of a dimension of the at least one tray.

5. The tray-based automated storage and retrieval system of claim 4, wherein a first tray locator assembly configured to move one or more guide pins of the first tray locator assembly in a first direction and a second tray locator assembly configured to move one or more guide pins of the second tray locator assembly in a second direction, wherein the second direction is opposite to the first direction.

6. The tray-based automated storage and retrieval system of claim 1, further comprising one or more sensors configured to detect a position of each of the plurality of trays on the conveyor system.

7. The tray-based automated storage and retrieval system of claim 1, further comprising a controller configured to:
   detect a trigger event for actuating the at least one tray locator assembly;
   extending the one or more guide pins vertically into the one or more slots of the at least one tray; and
   actuating the translational actuator to translate the at least one tray, wherein the translation of the at least one tray separates the second group of trays having the second size from the first group of trays along the conveyance plane to the second position in order to reduce tolerance stack up associated with the first group of trays.

8. A tray locator assembly for aligning one or more trays in a tray-based automated storage and retrieval system, the tray locator assembly comprising:
   one or more guide pin assemblies comprising one or more guide pins configured to engage one or more slots formed in a surface of at least one tray of the one or more trays; and
   at least one translational actuator operatively coupled to the one or more guide pin assemblies and configured to move the one or more guide pins inserted into the one or more slots so as to translate the at least one tray, wherein the translation of the at least one tray separates a second group of trays having a second size from a first group of trays having a first size along the conveyance plane to a second position in order to reduce tolerance stack up associated with the first group of trays.

9. The tray locator assembly of claim 8, further comprising a mounting plate movably coupled to the translational actuator, wherein the mounting plate configured to mount the one or more guide pin assemblies such that the translation actuator moves the mounting plate to move the one or more guide pins inserted into the one or more slots from a start position to an end position to separate the plurality of trays into the second group having the second size.

10. The tray locator assembly of claim 9, wherein the mounting plate comprises at least two guide pin assemblies, mounted at each end of the mounting plate, having at least two guide pins operable to be inserted in at least two slots of the at least one tray.

11. The tray locator assembly of claim 8, wherein the translational actuator comprises a belted actuator driven by a drive assembly.

12. The tray locator assembly of claim 8, wherein the translational actuator operable to move the one or more guide pins in a first direction and a second direction, wherein the second direction is opposite to the first direction.

13. The tray locator assembly of claim 8, wherein the one or more guide pin assemblies further comprise at least one actuator operable to extend the one or more guide pins into the one or more slots and retract the one or more guide pins back to an original position.

14. The tray locator assembly of claim 8, further comprising a proximity sensor for detecting a position of the one or more slots of the at least one tray.

15. A method of operating a tray-based automated storage and retrieval system, the method comprising:
   conveying a plurality of trays along a conveyance plane, wherein the plurality of trays are positioned together as a first group having a first size, and wherein at least one tray of the plurality of trays comprises one or more slots formed in a surface of the at least one tray;
   detecting, by a controller of the tray-based automated storage and retrieval system, a trigger event for actuating a tray locator assembly positioned adjacent the conveyance plane;
   engaging one or more guide pins of one or more guide pin assemblies of the tray locator assembly with the one or more slots of the at least one tray; and
   translating, by a translational actuator operatively coupled to the one or more guide pin assemblies, the at least one tray, wherein the translation of the at least one tray separates a second group of trays having a second size from the first group of trays along the conveyance plane to a second position in order to reduce tolerance stack up associated with the first group of trays.

16. The method of claim 15, further comprising separating the plurality of trays into the second group having the second size by moving the one or more guide pins inserted into the one or more slots from a start position to an end position.

17. The method of claim 15, wherein the trigger event comprises an indication, by one or more sensors of the tray-based automated storage and retrieval system, of the at least one tray being positioned adjacent the tray locator assembly.

18. The method of claim 15, wherein the trigger event comprises an indication, by one or more sensors of the tray-based automated storage and retrieval system, of receiving the plurality of trays on the conveyance plane.

19. The method of claim 15, wherein the trigger event comprises an indication, by one or more sensors of the tray-based automated storage and retrieval system, of misalignment of the at least one tray from a determined position.

20. The method of claim 19, further comprising determining, by the controller, the end position based on at least a degree of misalignment of the at least one tray from the determined position.

* * * * *